United States Patent
Sunshine et al.

(10) Patent No.: US 11,535,963 B2
(45) Date of Patent: *Dec. 27, 2022

(54) ROBOTIC WEAVING EQUIPMENT

(71) Applicant: Apple Inc., Cupertino, CA (US)

(72) Inventors: Daniel D. Sunshine, Austin, TX (US); Daniel A. Podhajny, Morgan Hill, CA (US); Didio V. Gomes, Sunnyvale, CA (US); Maurice Philip May, Sunnyvale, CA (US); David M. Kindlon, Felton, CA (US); Andrew L. Rosenberg, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 16/953,117

(22) Filed: Nov. 19, 2020

(65) Prior Publication Data

US 2021/0071325 A1    Mar. 11, 2021

Related U.S. Application Data

(63) Continuation of application No. 15/803,144, filed on Nov. 3, 2017, now Pat. No. 10,851,481.

(60) Provisional application No. 62/427,729, filed on Nov. 29, 2016.

(51) Int. Cl.
*D03D 49/04* (2006.01)
*D03D 51/06* (2006.01)
*B32B 5/02* (2006.01)
*D03D 15/56* (2021.01)

(52) U.S. Cl.
CPC .............. *D03D 49/04* (2013.01); *D03D 51/06* (2013.01); *B32B 5/024* (2013.01); *D03D 15/56* (2021.01); *G05B 2219/49384* (2013.01)

(58) Field of Classification Search
CPC ................... D03D 51/06; D03D 49/04; G05B 2219/49384
See application file for complete search history.

(56) References Cited

U.S. PATENT DOCUMENTS

| | | | |
|---|---|---|---|
| 3,322,158 | A | 5/1967 | Pfarrwaller |
| 3,412,763 | A | 11/1968 | Wueger |
| 4,473,096 | A | 9/1984 | Brouwer et al. |
| 4,480,665 | A | 11/1984 | Imamura et al. |
| 4,976,292 | A | 12/1990 | Matsumoto |
| 6,230,758 | B1 | 5/2001 | Krumm et al. |
| 6,315,008 | B2 | 11/2001 | Dornier et al. |

(Continued)

*Primary Examiner* — Nathan E Durham
(74) *Attorney, Agent, or Firm* — Treyz Law Group, P.C.; G. Victor Treyz; Kendall P. Woodruff (57) ABSTRACT

Weaving equipment may include warp strand positioning equipment that positions warp strands and weft strand positioning equipment that inserts weft strands among the warp strands to form fabric. The fabric may include insulating strands and conductive strands. The conductive strands may be coupled to electrical components. The warp strand positioning equipment may position the warp strands to form a shed. Component insertion equipment may be used to insert electrical components into the shed. The weaving equipment may have a reed. The reed may be used to help position an electrical component in the fabric. The weaving equipment may have take-down equipment and individually controllable warp fiber positioning and tensioning devices.

20 Claims, 8 Drawing Sheets

(56) References Cited

U.S. PATENT DOCUMENTS

| | | |
|---|---|---|
| 9,693,592 B2 * | 7/2017 | Robinson ............... A41D 31/00 |
| 10,174,444 B1 | 1/2019 | Podhajny et al. |
| 2009/0253325 A1 | 10/2009 | Brookstein et al. |
| 2009/0272455 A1 | 11/2009 | Speich |
| 2011/0000576 A1 | 1/2011 | Yokokawa |

\* cited by examiner

ROBOTIC WEAVING EQUIPMENT

This application is a continuation of U.S. patent application Ser. No. 15/803,144, filed Nov. 3, 2017, which claims the benefit of provisional patent application No. 62/427,729, filed Nov. 29, 2016, both of which are hereby incorporated by reference herein in their entireties.

BACKGROUND

This relates generally to weaving and, more particularly, to equipment for creating woven fabric.

It may be desirable to form electrical devices, enclosures, and other items from fabric. The fabric may contain strands of insulating material and strands of conductive material. In some situations, it may be desirable to form signal paths and other circuitry using the conductive strands and it may be desirable to couple electrical components to the signal paths. It can be challenging, however, to create desired signal paths in woven fabric and to incorporate electrical components into the woven fabric. If care is not taken, strands of material will not be routed along desired paths and components will not be interconnected as desired.

SUMMARY

Weaving equipment may include warp strand positioning equipment that positions warp strands and weft strand positioning equipment that inserts weft strands among the warp strands to form fabric. The fabric may include insulating strands and conductive strands. The conductive strands may be coupled to electrical components.

The warp strand positioning equipment may position the warp strands to form a shed. Component insertion equipment may be used to insert electrical components into the shed so that the electrical components can be incorporated into the fabric. The electrical components may be coupled to the conductive strands using solder or other conductive attachment mechanisms.

A reed may be used to help position an electrical component in the fabric. The reed may have a linear actuator controlled by control circuitry. During component insertion, movement of the reed may be temporarily paused.

The weaving equipment may have take-down equipment and individually controllable warp fiber positioning and tensioning devices. During weaving, the control circuitry may independently control the operation of the warp strand positioning equipment, the weft strand positioning equipment, the electrical component insertion equipment, the reed, the take-down equipment, and the warp tensioning equipment. As a result, these devices will not necessarily be simultaneously moving in synchronization but rather may be individually paused and restarted as desired to accommodate component insertion operations and other operations.

DETAILED DESCRIPTION

Electronic devices, enclosures, and other items may be formed from fabric such as woven fabric. The woven fabric may include strands of insulating and conductive material. Conductive strands may form signal paths through the fabric and may be coupled to electrical components such as light-emitting diodes and other light-emitting devices, integrated circuits, sensors, haptic output devices, and other circuitry.

Weaving equipment may be provided with individually adjustable components such as heddles (warp strand positioning equipment), weft strand positioning equipment, a reed, take down equipment, let off equipment (e.g., devices for individually dispensing and tensioning warp strands), strand processing and component insertion equipment, and other components for forming fabric items. The individual adjustability of these devices may allow weaving operations to be performed without requiring continuous lock-step synchronization of each of these devices, thereby allowing fabric with desired properties to be woven. As an example, normal reed movement and other weaving operations may be periodically suspended to accommodate component insertion operations.

Figure 1:
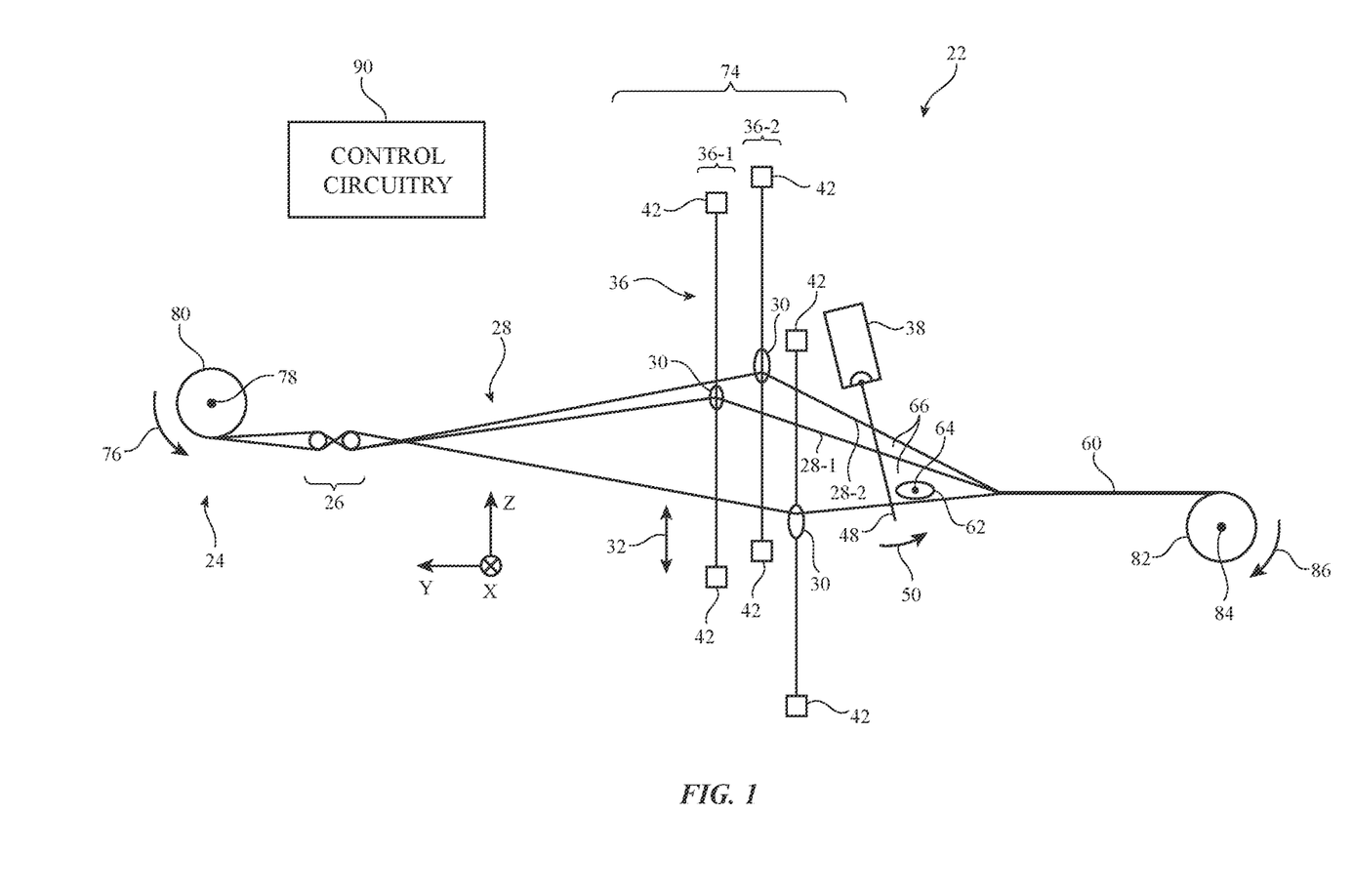
FIG. 1 is a side view of illustrative weaving equipment that may be used to form fabric in accordance with an embodiment.

Illustrative weaving equipment is shown in FIG. 1. Weaving equipment 22 may be used to form fabric 60. The strands of material used in forming fabric 60 may be single-filament strands (sometimes referred to as fibers) or may be threads, yarns, or other strands that have been formed by intertwining multiple filaments of material together. Strands may be formed from polymer, metal, glass, graphite, ceramic, natural materials such as cotton or bamboo, or other organic and/or inorganic materials and combinations of these materials. Conductive coatings such as metal coatings may be formed on non-conductive strands (e.g., plastic cores) to make them conductive. Reflective coatings such as metal coatings may be applied to strands to make them reflective. Strands may also be formed from single-filament metal wire (e.g., bare metal wire), multifilament wire, or combinations of different materials. Strands may be insulating or conductive.

Strands in fabric 60 may be conductive along their entire length or may have conductive segments. Strands may have metal portions that are selectively exposed by locally removing insulation (e.g., to form connections with other conductive strand portions). Strands may also be formed by selectively adding a conductive layer to a portion of a non-conductive strand.). Threads and other multifilament yarns that have been formed from intertwined filaments may contain mixtures of conductive strands and insulating strands (e.g., metal strands or metal coated strands with or without exterior insulating layers may be used in combination with solid plastic strands or natural strands that are insulating).

In general, the strands of material that are intertwined to form fabric 60 may be single filaments of material or may be threads, yarns, or other multifilament strands that have been formed by intertwining multiple single-filament strands. Strands may be formed from insulating materials, conductive materials, and combinations of insulating and conductive materials. The strands that are used in forming fabric 60 may include warp strands 28 and weft strands 64.

As shown in FIG. 1, weaving equipment 22 includes a warp strand source such as warp strand source 24. Source 24 may supply warp strands 28 from a warp beam or other strand dispensing structure. Source 24 may, for example, dispense warp strands 28 through electrically controlled dispensing rollers or other warp strand dispensing and tensioning equipment 26 as drum 80 rotates about rotational axis 78 in direction 76. Equipment 26 may contain sensors that measure strand flow and tension and electrically controlled actuators that allow flow and tension to be adjusted.

Control circuitry 90 may control the operation of equipment 26 and other electrically controllable components in equipment 22. Control circuitry 90 may include storage and processing circuitry for implementing control functions during weaving operations. The storage may include, for example, random-access memory, non-volatile memory such as read-only memory, hard disk storage, etc. The processing circuitry may include microprocessors, microcontrollers, digital signal processors, application-specific integrated circuits, and other circuits for executing software instructions obtained from storage.

Warp strands 28 may be positioned using warp strand positioning equipment 74. Equipment 74 may include heddles 36. Heddles 36 may each include an eye 30 mounted on a wire or other support structure that extends between respective positioners 42 (or a positioner 42 and an associated spring or other tensioner). Positioners 42 may be motors (e.g., stepper motors) or other electromechanical actuators. Positioners 42 may be controlled by control circuitry 90 during weaving operations so that warp strands 28 are placed in desired positions during weaving. In particular, control circuitry 90 may supply control signals that move each heddle 36 by a desired amount up or down in directions 32. By raising and lowering heddles 36 in various patterns in response to control signals from the control circuitry, different patterns of gaps (sheds) 66 between warp strands 28 may be created to adjust the characteristics of the fabric produced by equipment 22.

Weft strands such as weft strand 64 may be inserted into shed 66 during weaving to form fabric 60. Weft strand positioning equipment 62 may be used to place one or more weft strands 64 between the warp strands forming each shed 66. Weft strand positioning equipment 62 for equipment 22 may include one or more shuttles and/or may include shuttleless weft strand positioning equipment (e.g., needle weft strand positioning equipment, rapier weft strand positioning equipment, or other weft strand positioning equipment such as equipment based on projectiles, air or water jets, etc.). For example, the weft strand positioning equipment of equipment 22 may include an electrically controllable rapier weft strand device or other weft strand insertion equipment that is controlled by control circuitry 90. Weft strand positioning equipment 62 can be controlled independently of other components in equipment 22. For example, weft strand insertion operations may be temporarily suspended with or without suspending other weaving operations.

After each pass of weft strand 64 is made through shed 66, reed 48 (e.g., a reed member with slots or other openings through which respective warp strands 28 pass) may be moved in direction 50 by reed positioner 38 to push the weft strand that has just been inserted into the shed between respective warp strands 28 against previously woven fabric 60, thereby ensuring that a satisfactorily tight weave is produced. Reed 48 may be moved linearly (e.g., parallel to dimension Y) or may rotate back and forth about a shaft to approximate linear reciprocating movement. The positioner for the reed (positioner 38) may be, for example, a linear actuator that is controlled by control signals from control circuitry 90 and that moves the reed towards and away from the edge of fabric 60.

Fabric 60 that has been woven may be gathered on fabric collection equipment such as take-down roller 82 or other take-down equipment. Roller 82 may collect woven fabric 60 as roller 82 rotates in direction 86 about rotational axis 84. Warp strand dispensing and tensioning equipment 26, heddles 36, reed 48 (including positioner 38), weft strand insertion equipment 62, and take-down (take-off) equipment such as roller 82 may each be independently controlled by control circuitry 90. At the same time, and in coordination with the control of these components, control circuitry 90 may control component insertion and strand processing equipment in equipment 22 (e.g., so that light-emitting diodes, integrated circuits, sensors, and other electrical components can be inserted into fabric 60).

Figure 2:
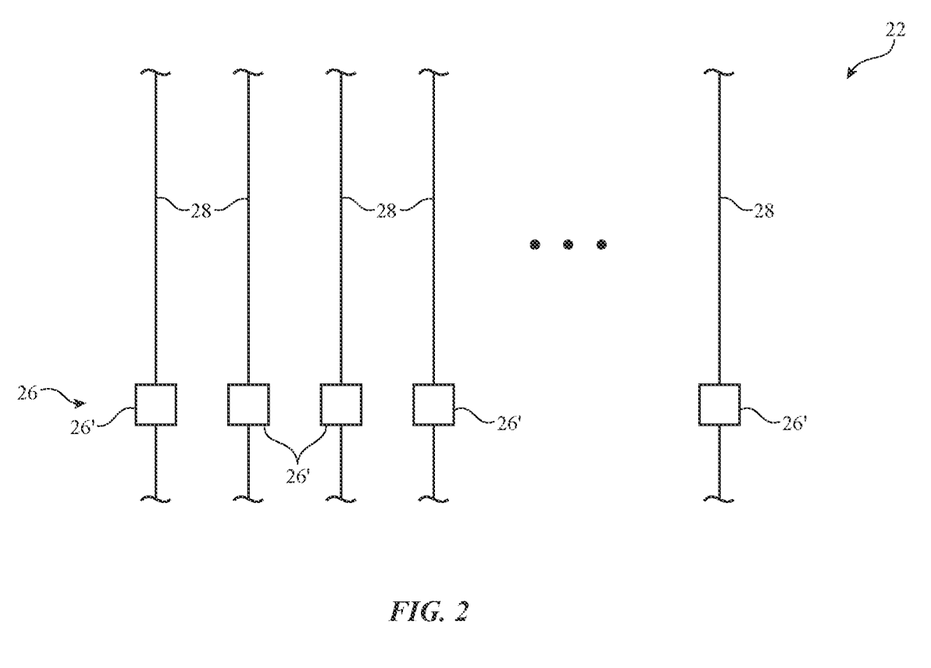
FIG. 2 is a diagram of illustrative individually controllable warp strand flow and tensioning devices for controlling the flow and tension of warp strands during weaving in accordance with an embodiment.

FIG. 2 shows how warp strand dispensing and tensioning equipment 26 may include multiple warp strand dispensing and tensioning devices such as warp strand dispensing and tensioning units 26'. There may be, for example, a respective individually controlled warp strand dispensing and tensioning unit 26' associated with each warp strand 28. Strand dispensing and tensioning units 26' that each handle multiple warp strands 28 may also be included in equipment 22. Units 26' may have sensors that measure strand tension, strand dispensing speed, and how much of each strand has been dispensed (dispensed strand length). Units 26' may also contain motors or other actuators for adjusting strand dispensing and for adjusting strand tension. Control circuitry 90 may dynamically control each unit 26' to control how much of each respective warp strand 28 is dispensed and to control the tension of that strand 28.

Figure 3:
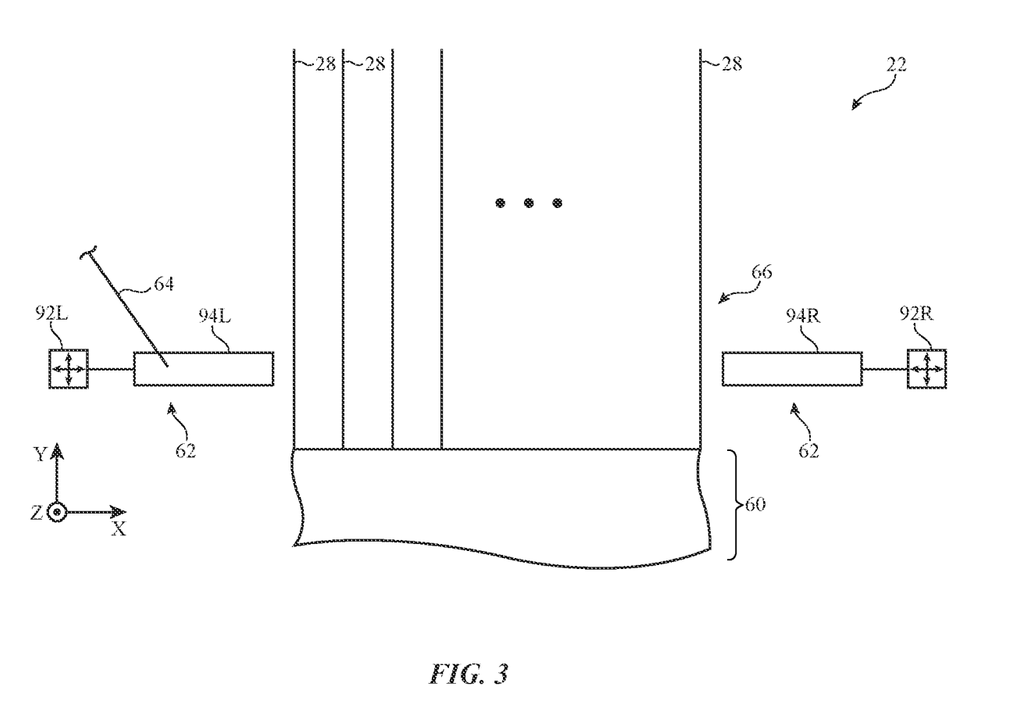
FIG. 3 is a top view of illustrative weft strand insertion equipment in accordance with an embodiment.

FIG. 3 is a top view of a portion of equipment 22 showing how weft strand insertion equipment 62 may be used to insert weft strands such as weft strand 64 into shed 66 of warp strands 28 to form fabric 60. In the example of FIG. 3, weft strand insertion equipment 62 includes left rapier 94L and right rapier 94R, which move back and forth in synchronization to insert strand 64 into fabric 60. Other types of weft strand insertion equipment (e.g., movable needles, air jet equipment, other moveable members for inserting strand 64, etc.) may be used in equipment 22, if desired.

As shown in FIG. 3, left rapier 94L may be moved back and forth along dimension X by electrically controlled positioner (linear actuator) 92L. Right rapier 94R may likewise be moved back and forth along dimension X by electrically controlled positioner (linear actuator) 92R. The positions of rapiers 94L and 94R may be controlled by control circuitry 90. During use of equipment 22, weft strand insertion operations may be controlled independently from the control of other weaving equipment components. For example, control circuitry 90 may direct weft strand insertion equipment 62 to momentarily pause weft strand insertion so that electrically controlled processing and component insertion equipment may perform processing operations on strands 28 and/or 64 while inserting electrical components into fabric 60 (e.g., by soldering contacts on electrical components to conductive strands in strands 28 and/or 64).

Figure 4:
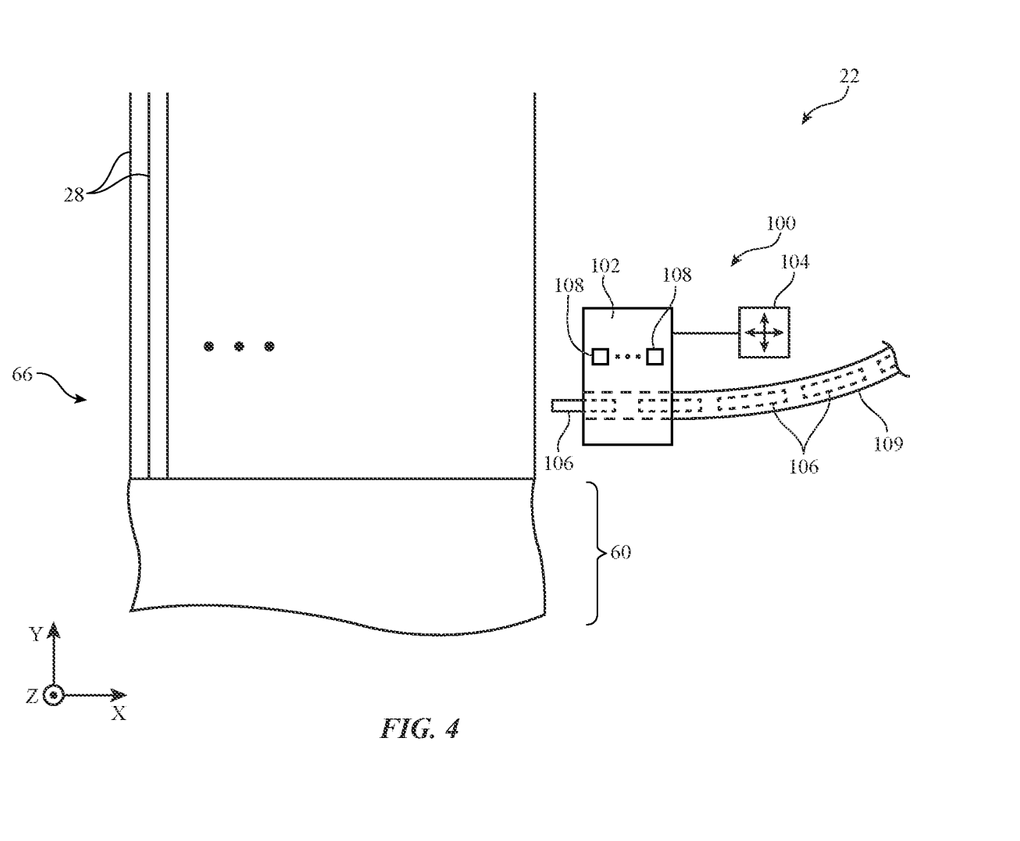
FIG. 4 is a top view of an illustrative electrically controlled device for inserting electrical components and processing strands during weaving in accordance with an embodiment.

A top view of illustrative equipment for processing strands 28 and/or 64 and for inserting components into fabric 60 is shown in FIG. 4. As shown in FIG. 4, equipment 100 may be used for performing strand processing operations and/or electrical component insertion operations and may therefore sometimes be referred to as strand processing equipment, component insertion equipment and/or strand processing and component insertion equipment. Equipment 100 may have a movable structure such as processing and component dispensing head 102 and positioning equipment such as electrically controlled positioner 104 for positioning head 102 within shed 66. During operation, positioner 104 may move head 102 into shed 66 along the X axis of FIG. 4.

Head 102 may be used to dispense components 106 (e.g., electrical components). For example, head 102 may place components 106 in shed 66 and may couple components 106 to conductive strands 28 and/or 64. Components 106 may be provided to head 102 via tube 109 or other dispensing mechanism (a reel of tape, a hopper, etc.). Components 106 may include sensors, buttons, light-emitting diodes, integrated circuits, or other electrical components.

Head 102 may include one or more devices for mounting electrical components in fabric 60 and/or performing other processing operations on strands 28 and/or 64. Devices 108 may include an electrically controlled actuator for regulating the dispensing of components 106 into fabric 60 (e.g., when head 102 is in shed 66), may include sensors for monitoring the positions of strands of material, sensors for monitoring the positions of components, sensors for measuring temperature, sensors for measuring resistance, or other devices for gathering user input and/or data on the environment surrounding head 102. If desired, devices 108 may include heating elements, lasers, and/or other components that generate heat, light, and/or other energy for removing insulation from the exterior of insulated conductive strands, for melting solder so that contacts on components 106 and/or other conductive structures can be soldered to conductive strands of material, components for applying coatings to strands of material, and/or other equipment for modifying strands of material such as strands 28 and/or 64, for coupling components such as electrical components 106 to conductive strands in strands 28 and/or 64, and/or other electrically controllable devices for processing strands 28 and/or 64 and for soldering components such as components 106 to fabric 60 or otherwise mounting components 106 to strands 28 and/or 64.

Figure 5:
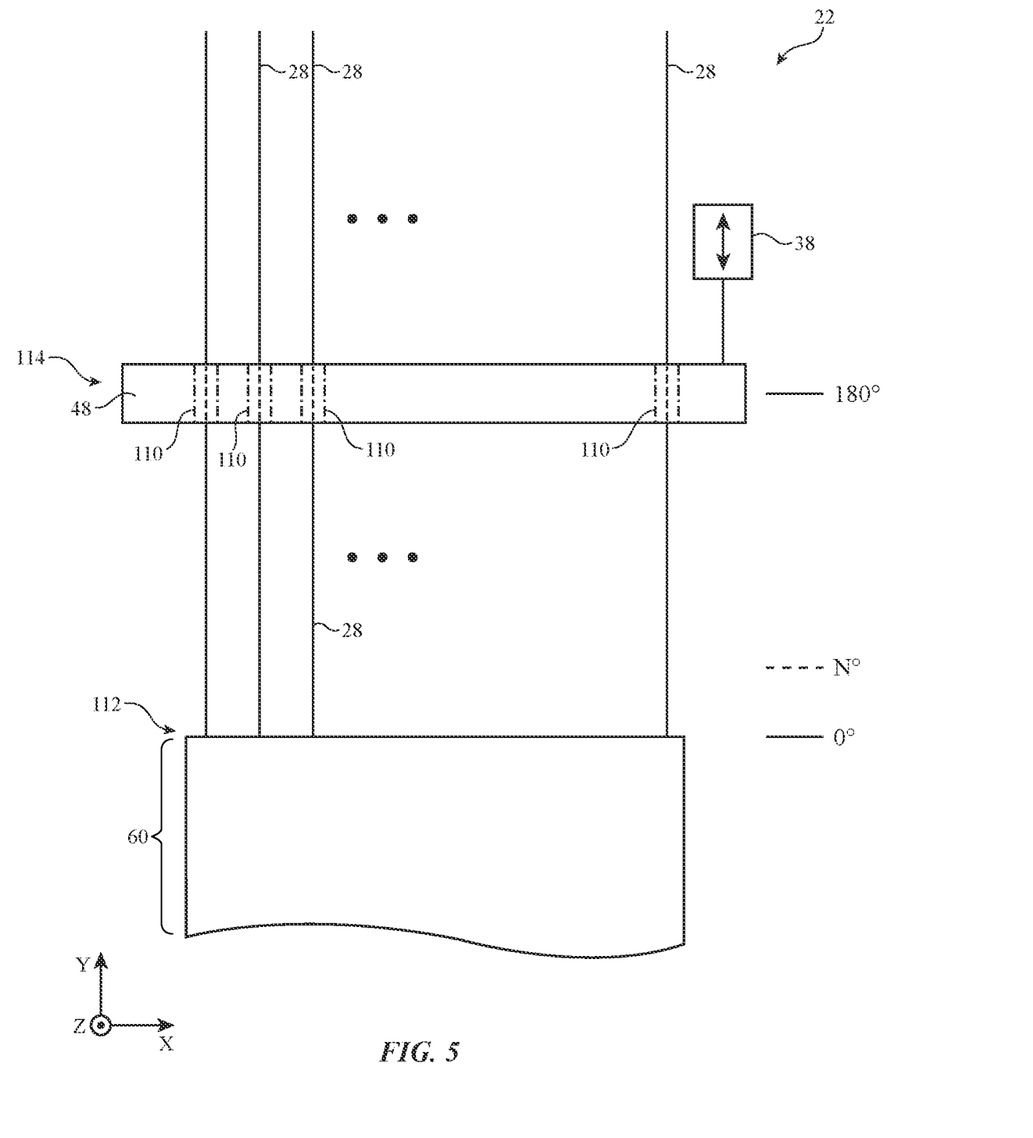
FIG. 5 is a top view of an illustrative reed and associated fabric during weaving in accordance with an embodiment.

FIG. 5 is a top view of weaving equipment 22 in the vicinity of shed 66 showing how reed 48 may be moved linearly back and forth along the Y axis of FIG. 5 using a linear actuator such as positioner 38 of FIG. 5. Positioner 38 may be electrically controlled by control circuitry 90. Reed 48 may have openings (e.g., slots, etc.) such as openings 110 through which respective warp strands 28 may pass to fabric 60. During operation, positioner 38 may adjust the distance of reed 48 from fabric 60. The position of reed 48 may be represented in degrees (e.g., 0° to 180°). In the 0° position, reed 48 is at beat-up point 112 (also sometimes referred to as fell point 112) and is aligned with the exposed edge of fabric 60. In the 180° position, reed 48 is at open shed position 114 and is at its maximum distance from the edge of fabric 60. During operation, control circuitry 90 may supply control signals to positioner 38 to adjust the position of reed 48 (e.g., to place reed 48 at desired positions between maximum distance position 114 and minimum distance position 112). For example, control circuitry 90 may position reed 48 at N°, as shown in FIG. 5, where N is a value from 0 to 180.

Figure 6:
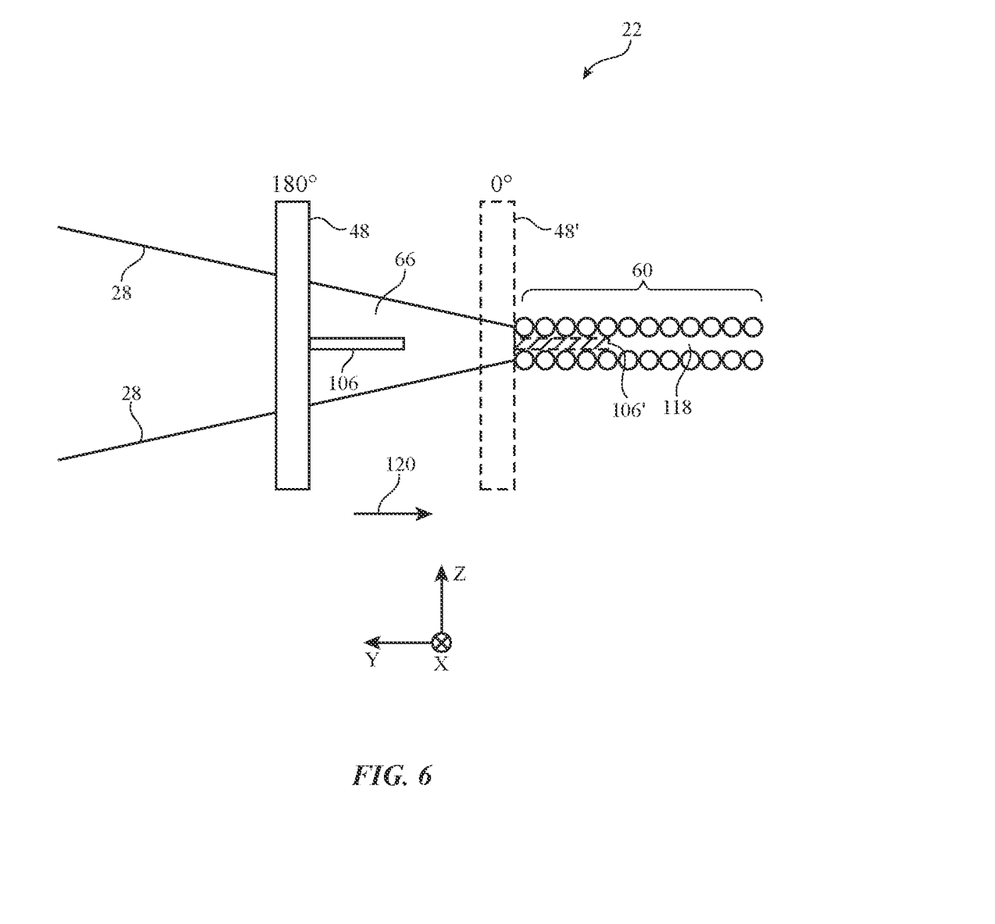
FIG. 6 is a side view of an illustrative reed being used to assist in the insertion of a component into a fabric pocket in fabric during weaving in accordance with an embodiment.

FIG. 6 is a cross-sectional side view of a portion of weaving equipment 22 in the vicinity of shed 66 in a scenario in which reed 48 is being used to help position an electrical component (component 106) within cavity 118 of fabric 60. During component insertion operations, control circuitry 90 may temporarily suspend movement of weft insertion equipment 62 (e.g., rapiers 94L and 94R may be moved out of shed 66 and movement of rapiers 94L and 94R may be momentarily paused). While rapiers 94L and 94R are at rest and while heddles 36 are being used to create shed 66 of FIG. 6, reed 48 may be moved in direction 120 toward fabric 60. This pushes components 106 in direction 120 towards fabric 60. Component 106 may be a component that has been placed in shed 66 by equipment 100 of FIG. 4 or other component placement equipment (as an example). Movement of reed 48 may continue until the 0° position or other suitable position (e.g., N°), as shown by reed location 48'. When reed 48 reaches location 48', component 106 may be fully inserted into cavity 118, as shown by illustrative component location 106' in the example of FIG. 6. During insertion of component 106 into fabric 60, reed 48 may be moved at a speed which is potentially different (faster or slower) than the speed at which reed 48 is moved back and forth between the 0° and 180° positions during normal weaving operations to weave fabric 60.

Figure 7:
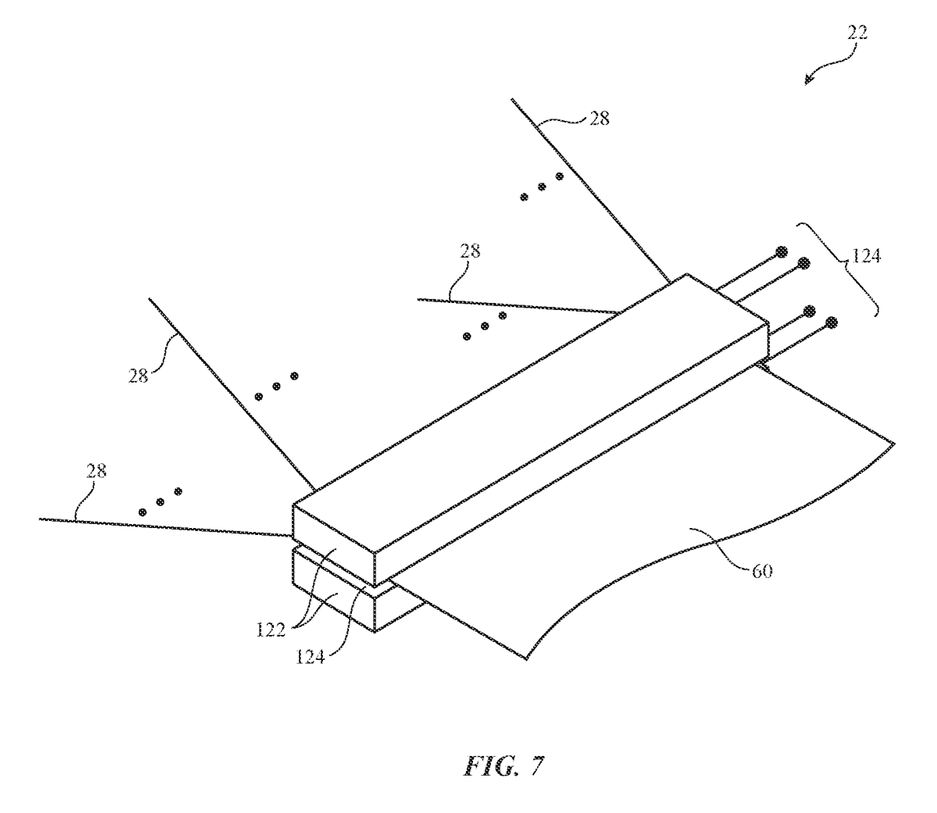
FIG. 7 is a perspective view of illustrative heated bars that may be used to heat fabric during weaving in accordance with an embodiment.

As shown in FIG. 7, fabric 60 that has been woven by equipment 22 may pass through a slot such as slot 124 between a pair of opposing members such as metal bars 122. Bars 122 may contain heating elements and/or may be controlled by positioners so that fabric 60 may be heated and/or pressed between bars 122 in response to control signals from control circuitry 90. Bars 122 may have terminals such as terminals 124 to which control signals (e.g., current for heating ohmic heaters in bars 122, etc.) may be applied by control circuitry 90 during operation.

Figure 8:
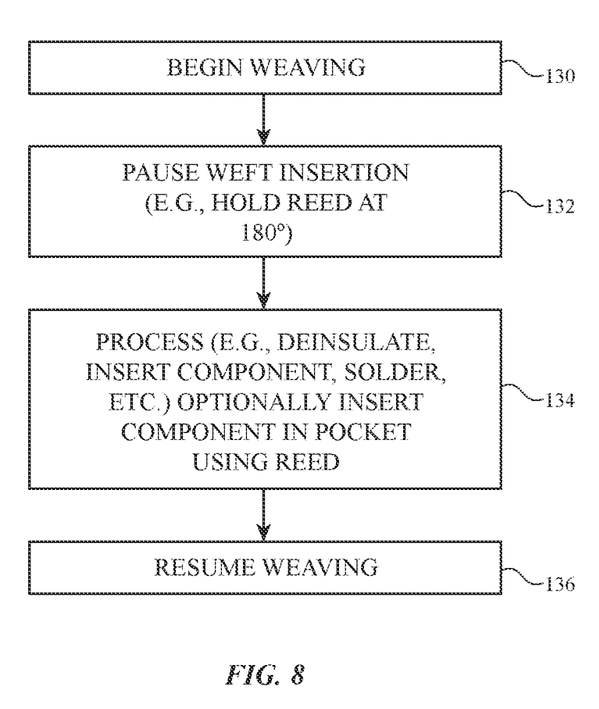
FIG. 8 is a flow chart of illustrative steps involved in using weaving equipment in accordance with an embodiment.

Illustrative operations involved in using equipment 22 to form fabric 60 are shown in FIG. 8. During the operations of step 130, equipment 22 may begin weaving fabric 60. During weaving, control circuitry 90 may independently control weaving equipment components such as warp fiber dispensing and tensioning devices 26', heddles 36, reed 48, weft fiber insertion equipment 62, and fabric take-down equipment such as roller 82 to weave fabric with desired properties. For example, the position to which reed 48 is moved each weft insertion cycle may be adjusted dynamically to change the feel (the "hand") of fabric 60 (e.g., to adjust the hand of fabric 60 as a function of position in fabric 60).

When it is desired to insert an electrical component into fabric 60, control circuitry 90 may pause operation of weft strand insertion equipment 62, may position reed 48 away from fabric 60 (e.g., at the 180° location of FIG. 6) while momentarily pausing motion of reed 48, and may direct heddles 36 to spread apart warp fibers 28 to form shed 66 (step 132). Control circuitry 90 may then use equipment 100 to process strands 28 and/or 64 and to optionally solder components such as electrical component 106 of FIG. 4 to conductive strands (step 134). If desired, reed 48 may be moved towards fabric 60 during the operations of step 134 to help insert component 106 into cavity 118 in fabric 60 as shown in FIG. 6 and/or equipment 100 may be used to apply hot air, heat from a heat lamp, or other energy to melt solder and thereby electrically mount component 106 to fabric 60. Heated bars 122 of FIG. 7 and/or other equipment (e.g., part of equipment 100, external equipment, etc.) may also be used in performing soldering operations, etc.

Following attachment of one or more electrical components 106 to fabric 60 (e.g., using equipment 100 and/or reed 48, etc.), motion of reed 48 and weft strand insertion equipment 62 may be resumed and normal weaving may continue (step 136).

The foregoing is merely illustrative and various modifications can be made to the described embodiments. The foregoing embodiments may be implemented individually or in any combination.

What is claimed is:

1. A method for weaving warp strands and weft strands to form fabric, comprising:
    with warp strand positioning equipment, positioning the warp strands to create a shed;
    with control circuitry, pausing motion of a reed while the warp strand positioning equipment remains in motion; and
    with component insertion equipment, inserting an electrical component in the shed while the motion of the reed is paused.

2. The method defined in claim 1 further comprising:
    coupling the electrical component to a given one of the warp strands.

3. The method defined in claim 2 wherein coupling the electrical component to the given one of the warp strands comprises electrically coupling the electrical component to the given one of the warp strands.

4. The method defined in claim 3 wherein electrically coupling the electrical component to the given one of the warp strands comprises soldering the electrical component to the given one of the warp strands.

5. The method defined in claim 4 further comprising:
    while the motion of the reed is paused, removing insulation from the given one of the warp strands to expose a conductive segment.

6. The method defined in claim 5 wherein soldering the electrical component to the given one of the warp strands comprises soldering the electrical component to the exposed conductive segment.

7. The method defined in claim 6 wherein removing the insulation from the given one of the warp strands comprises removing the insulation with a laser.

8. The method defined in claim 1 further comprising:
    forming a pocket in the fabric.

9. The method defined in claim 8 further comprising:
    with the component insertion equipment, inserting the electrical component into the pocket.

10. The method defined in claim 1 further comprising:
    with the control circuitry, pausing motion of weft strand positioning equipment while inserting the electrical component in the shed.

11. Equipment for weaving warp strands and weft strands to form fabric, comprising:
    warp strand positioning equipment that positions the warp strands to create a shed;
    a reed through which the warp strands pass, wherein the reed moves toward and away from the fabric;
    component insertion equipment that inserts an electrical component into the fabric; and
    control circuitry that temporarily reduces a speed of motion of the reed while the electrical component is inserted into the fabric and while the warp strand positioning equipment remains in motion.

12. The equipment defined in claim 11 further comprising a laser that removes insulation from a given one of the warp strands before the electrical component is inserted into the fabric.

13. The equipment defined in claim 12 further comprising equipment that solders the electrical component to the given one of the warp strands.

14. The equipment defined in claim 11 further comprising weft strand positioning equipment, wherein the control circuitry temporarily pauses motion of the weft strand positioning equipment while the electrical component is inserted into the fabric.

15. The equipment defined in claim 11 wherein the component insertion equipment inserts the electrical component into a pocket in the fabric.

16. A method for weaving warp strands and weft strands to form fabric, comprising:
    with warp strand positioning equipment, positioning the warp strands to create a shed;
    with control circuitry, reducing a speed of motion of a reed; and
    while the speed of motion of the reed is reduced, removing insulation from a given one of the warp strands to expose a conductive segment, inserting an electrical component into the shed, and attaching the electrical component to the conductive segment.

17. The method defined in claim 16 further comprising:
    with the control circuitry, pausing motion of weft strand positioning equipment while the insulation is removed from the given one of the warp strands and while the electrical component is electrically attached to the conductive segment.

18. The method defined in claim 16 further comprising:
    forming a pocket in the fabric; and
    inserting the electrical component into the pocket.

19. The method defined in claim 16 wherein removing the insulation from the given one of the warp strands comprises removing the insulation from the given one of the warp strands with a laser.

20. The method defined in claim 16 wherein attaching the electrical component to the conductive segment comprises soldering the electrical component to the conductive segment.

* * * * *